3,269,985
PREPARATION OF ORGANIC POLYCARBONATES FROM A BISCHLOROFORMATE AND WATER
Donald F. Loncrini, Schenectady, N.Y., assignor to General Electric Company, a corporation of New York
No Drawing. Filed Oct. 19, 1961, Ser. No. 146,343
6 Claims. (Cl. 260—47)

This invention relates to the preparation of organic carbonates, and more particularly is concerned with a simplified process for preparing polycarbonate resins.

In most known methods for preparing polycarbonates, dihydric alcohols or phenols are employed directly as reactants in the polymerization reaction. The purity of the dihydric compounds used in such capacities must be quite high in order to assure the production of acceptable carbonate polymers. However, purification of dihydric compounds, and particularly the purification of dihydric phenols to the extent necessary to provide an acceptable resin product which requires little or no purification itself involves the expenditure of considerable effort and expense.

Accordingly, it is the primary object of the present invention to provide a process for preparing polycarbonate resins, which process does not include the use of a dihydric compound directly as a reactant in the polymerization reaction.

Briefly stated, this as well as other objects may be attained in accordance with the present invention by reacting together, in the presence of a tertiary amine, and as the sole reactive ingredients, water and at least one compound selected from the group consisting of bishaloformates of dihydro alcohols and bishaloformates of dihydric phenols, in which compound the haloformate groups are the sole reactive groups.

A major advantage of the process of the present invention over the methods for preparing carbonate resins heretofore employed is that the bishaloformates of dihydric compounds, and particularly, the bishaloformates of the dihydric phenols, may be relatively easily and inexpensively processed to a degree of purity more than adequate to assure the preparation of an acceptable polymer product. Moreover, the present process involves a reaction which may be consummated at temperatures below 75° C. Due to the mild reaction conditions, therefore, degradative side reactions are eliminated, thus insuring the production of a pure resin product.

The linear carbonate polymers which may be prepared by the method of the present invention may be typified as possessing repeating structural units of the formula

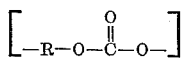

where R is a divalent organic radical of either the dihydric alcohol or the dihydric phenol whose bishaloformate was employed in the resin producing reaction. It is, of course, possible to employ the bishaloformates of two or more different dihydric compounds if a copolymer rather than a homopolymer is desired.

In general, the bishaloformate of any dihydric alcohol or phenol may be used in the process of the present invention, provided that the haloformate groups on the compound employed in the polymer synthesis are the sole reactive groups. Accordingly, groups which are inert in the sense that they do not enter into the reaction (such as, for example, nitro groups, sulphonate groups, ether groups, halogen groups and carbonyl groups) may be present as substituents on the haloformate compound used to provide the polycarbonate resin.

Included among the typical dihydric alcohols whose corresponding bishaloformates may be used in the practice of the present invention are, for example, diethylene glycol, propane diols, butane diols, hexane diols, heptane diols, octane diols, neopentyl glycol, aryl-alkyl glycols, such as 4,4'-dihydroxyethylphenyl, styrene glycols, cycloaliphatic glycols, such as 1,4-dihydroxycyclohexane, 2,2-bis-(4-hydroxycyclohexyl)-propane, and bis-(4-hydroxycyclohexyl)-methane.

In general, the dihydric phenols whose corresponding bishaloformates may be used in accordance with the method of the present invention are mononuclear or polynuclear aromatic compounds containing, as functional groups, two hydroxyl radicals each of which is attached directly to a carbon atom of an aromatic nucleus. Typical dihydric phenols are hydroquinone; resorcinol; 2,2-bis-(4-hydroxyphenyl)-propane; bis-(p-hydroxyphenyl)-sulfone; and p,p'-dihydroxydiphenyl ether. A variety of additional dihydric phenols whose bishaloformates may be used in the practice of the present invention are described in United States Patent 2,999,835, Goldberg, assigned to the assignee of the present invention.

The bishaloformate of any dihydric alcohol or phenol may easily be prepared by reacting the dihydroxy compound with a carbonyl halide. For example, the bischloroformate of 2,2-bis-(4-hydroxyphenyl)-propane may conveniently be obtained by reacting that compound with phosgene, as described, for instance, in British Patent 613,280.

In carrying out the polymerization reaction in accordance with the present invention, the bishaloformate, or mixture of bishaloformates employed is reacted with water in the presence of a tertiary amine for a time which may vary from a few seconds to several minutes or more, depending upon the particular polymer prepared, the degree of polymerization desired, and the choice of other reaction conditions. The temperatures at which the reaction may be performed may also vary, although entirely successful results may be attained at temperatures ranging from room temperature to 75° C., and preferably from 20 to 50° C. The quantity of tertiary amine used may range from approximately 98% of theory to a fairly large excess based upon the quantity of the bishaloformate to be reacted. A preferred upper range for the quantity of tertiary amine is 102% of theory. Although a larger excess may be used, it is neither necessary nor economically desirable. The molar quantity of water used should be substantially equal to the molar quantity of bishaloformate to be converted. Theoretically, one mole of water reacts with one mole of bishaloformate to produce the polymer and two moles of the corresponding halo acid. The two moles of the halo acid are in turn "attached" by two moles of tertiary amine.

In general, any tertiary amine which is inert, i.e., nonreactive with respect to the haloformate group, may be employed in accordance with the method of the present invention. Included among the tertiary amines which may be used in this capacity are the aliphatic tertiary amines, such as, for example, trimethylamine; triethylamine; N,N-dimethylamine; and tripropylamine; as well as aromatic tertiary amines, such as, tribenzylamine; N,N-dimethylbenzylamine; and N,N-dimethyl-p-nitrobenzylamine. Included also are the heterocyclic tertiary amines such as, for example, pyridine; picoline; pyridazine, pyridimine; pyrazine; quinoline; and isoquinoline.

In many instances, the tertiary amine employed may act as a solvent for the reactants, as in the case of pyridine, for example. In the event the amine used does not act in this capacity, a small quantity of a common solvent may advantageously be employed. In general, any solvent for the reactants which is inert in the sense that it does not enter into the reaction may be used. Examples of such solvents are benzene, xylene, ethylene dichloride, propylene dichloride, chlorobenzene, toluene, carbon tetrachloride, acetone, chloroform and cyclohexanone.

In order that those skilled in the art may better understand how the present invention may be practiced, the following examples are given by way of illustration and not by way of limitation.

*Example 1*

A suitable reaction vessel, equipped with a stirrer and a dropping funnel for adding reactants to the vessel, was charged with 21 ml. of pyridine and 0.9 g. of water. 11.5 g. of redistilled diethylene glycol bischloroformate were then added dropwise to the pyridine-water mixture, with stirring, over a period of about 30 minutes. The reaction vessel was cooled in an ice water bath throughout the addition. At the completion of the addition, the mixture was warmed slightly over a steam bath. Following the addition of a slight excess of 2 N hydrochloric acid, the oily suspension was extracted five times with 30 ml. of chloroform. The chloroform extract was then washed free of acid with saturated brine, dried over calcium chloride, and concentrated under vacuum. Six g. of $\beta,\beta'$-oxydiethylenepolycarbonate having a molecular weight of 595 were thus obtained.

*Example 2*

To a flask containing a mixture of 40 ml. pyridine, 25 ml. of methylene chloride and 3.6 ml. of water, were added dropwise, and with stirring, 23.1 g. of diethylene glycol bischloroformate in 25 ml. of methylene chloride. The clear solution, after stirring for an additional 15 minutes, was swamped with 150 ml. of water. The organic layer was separated, washed successively with 2 N HCl to remove pyridine, and with saturated brine to remove the acid, and subsequently dried over calcium chloride. 3 g. of $\beta,\beta'$-oxydiethylenepolycarbonate having a molecular weight of 733 were thus obtained.

*Example 3*

This example illustrates the preparation of a bishaloformate of a dihydric phenol.

To a vessel charged with a solution of 100 g. (1 mol) phosgene, and 500 cc. of dry toluene, were added dropwise a solution of 57 g. (0.25 mol) of 2,2-bis-(4-hydroxyphenyl) propane in 250 cc. of dioxane and 60.5 g. (0.5 mol) of dimethyl aniline dissolved in 60 cc. of dioxane. The reaction mixture was then heated over a steam bath for about 3 hours. The precipitate which formed was removed by filtration, and the filtrate concentrated under vacuum. 90.2 g. of oil, which gradually solidified, were thus obtained. The resulting crystals had a melting point of 88–90° C. and were identified (by infra-red spectroscopy) as the bis-chloroformate of 2,2-bis-(4-hydroxyphenyl)-propane.

*Example 4*

A mixture consisting of 200 ml. of chlorobenzene, 50 ml. of pyridine, and 35.3 g. of the bis-chloroformate of 2,2-bis(4-hydroxyphenyl)-propane (obtained from Example 3 above) was added dropwise and with stirring, to a flask containing a mixture of 50 ml. of pyridine and 2 ml. of water. The reaction mixture was heated slightly to promote solution of the bischoloroformate, and was then allowed to cool to room temperature. The resulting product was precipitated with isopropyl alcohol, filtered, and dried. 24.5 g. of polymer having an intrinsic viscosity of 0.34 in dioxane at a temperature of 30.3° C. were thus obtained.

*Example 5*

The following reactants were used to obtain a polycarbonate resin:

Bischloroformate of 2,2-bis - (4 - hydroxyphenyl)-
  propane _____ grams__ 35.3
Water _____ ml__ 2

The method of Example 4 was followed except that 200 ml. of pyridine were used in lieu of the chlorobenzene. 24 g. of polymer having an intrinsic viscosity of 0.12 in dioxane were thus obtained.

By virtue of the present invention, particularly pure organic carbonates having utility in the manufacture of films, fibers, molded or extruded parts, and in the preparation of surface coatings for use in structural, decorative and electrical applications, may be produced.

It should be understood that this invention is not to be considered limited to any of the specific embodiments herein disclosed, but may be used in other ways without departure from the spirit of the invention and the scope of the appended claims.

What I claim as new and desire to secure by Letters Patent of the United States is:

1. The process for preparing a linear polycarbonate resin which comprises reacting together, in the presence of a tertiary amine, and as the sole reactive ingredients, water and at least one compound selected from the group consisting of bishaloformates of dihydric alcohols and bishaloformates of dihydric phenols, in which compound the haloformate groups are the sole reactive groups.

2. The process according to claim 1 in which the sole reactive ingredients are water and at least one bishaloformate of a dihydric alcohol.

3. The process according to claim 1 in which the sole reactive ingredients are water and at least one bishaloformate of a dihydric phenol.

4. The process according to claim 1 in which the tertiary amine is pyridine.

5. The process for preparing a linear polycarbonate resin which comprises reacting together in the presence of a tertiary amine, and as the sole reactive ingredients, water and the bishaloformate of diethylene glycol.

6. The process for preparing a linear polycarbonate resin which comprises reacting together in the presence of a tertiary amine, and as the sole reactive ingredients, water and the bishaloformate of 2,2-bis-(4-hydroxyphenyl)-propane.

References Cited by the Examiner

UNITED STATES PATENTS

| | | | |
|---|---|---|---|
| 3,028,365 | 4/1962 | Schnell | 260—47 X |
| 3,046,255 | 7/1962 | Strain | 260—47 X |

FOREIGN PATENTS

| | | |
|---|---|---|
| 587,933 | 5/1947 | Great Britain. |
| 878,115 | 9/1961 | Great Britain. |

WILLIAM H. SHORT, *Primary Examiner.*

LOUISE P. QUAST, *Examiner.*

J. C. MARTIN, *Assistant Examiner.*